(No Model.) 4 Sheets—Sheet 1.
W. T. FOX.
AIR COMPRESSOR.
No. 321,206. Patented June 30, 1885.
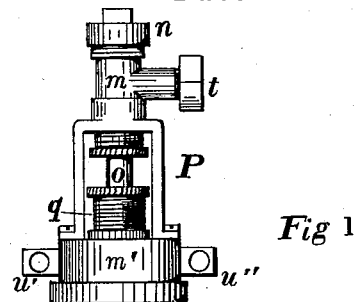
Fig 1
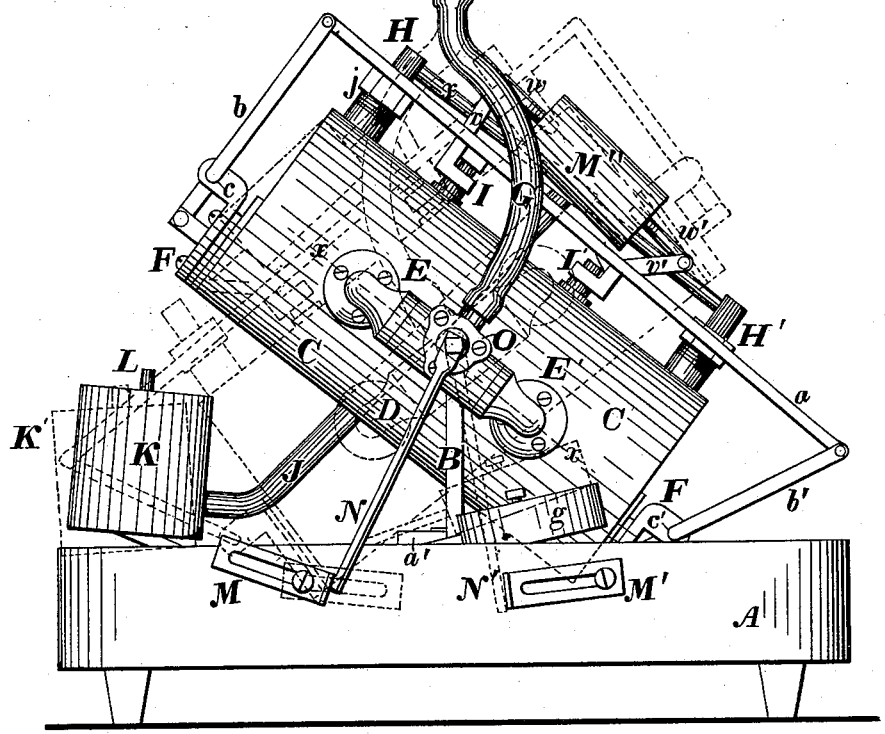
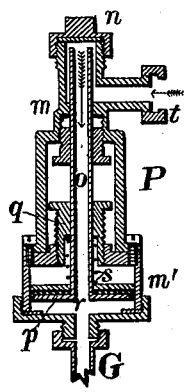
Fig 2
WITNESSES—
H. G. Phillips
S. White Paine
INVENTOR=
Wm. T. Fox,
by Geo. B. Selden,
Atty.

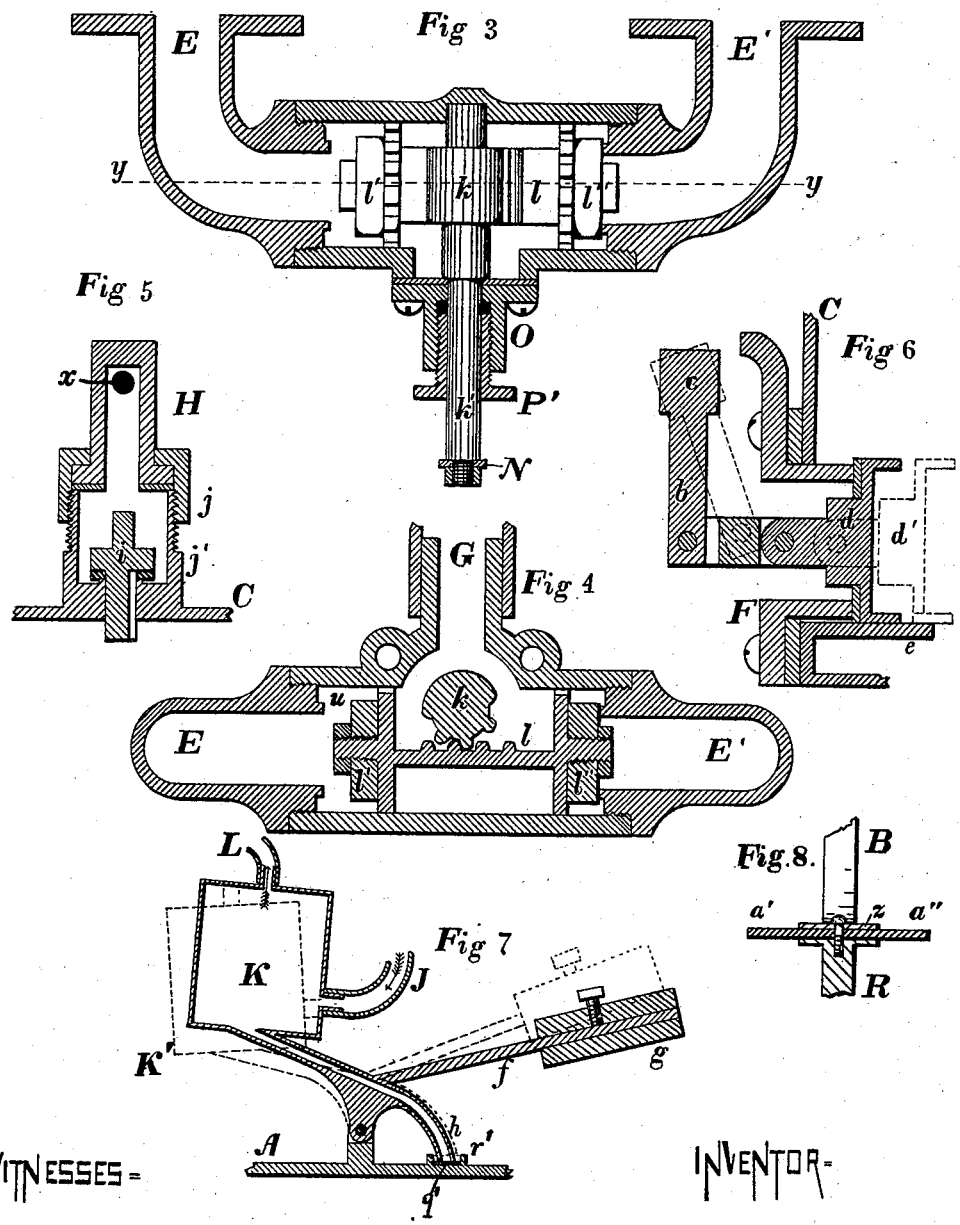

(No Model.)  4 Sheets—Sheet 3.

W. T. FOX.
AIR COMPRESSOR.

No. 321,206. Patented June 30, 1885.

Witnesses:
Theo. L. Popp
Geo. E. Pitman

Inventor:
William T. Fox
By Wilhelm Bonner
Attorneys.

(No Model.) 4 Sheets—Sheet 4.

W. T. FOX.
AIR COMPRESSOR.

No. 321,206. Patented June 30, 1885.

Witnesses:
Theo. L. Popp
Geo. E. Pitman

W. T. Fox Inventor.
By Wilhelm Bonner
Attorneys.

UNITED STATES PATENT OFFICE.

WILLIAM T. FOX, OF ROCHESTER, NEW YORK, ASSIGNOR TO THE STEAM GAUGE AND LANTERN COMPANY, OF SAME PLACE.

AIR-COMPRESSOR.

SPECIFICATION forming part of Letters Patent No. 321,206, dated June 30, 1885.

Application filed January 28, 1884. (No model.)

*To all whom it may concern:*

Be it known that I, WILLIAM T. FOX, of Rochester, Monroe County, New York, have invented an Improved Air-Compressor, of which the following is a specification, reference being had to the accompanying drawings.

My present invention relates to certain improvements on the invention for which Letters Patent No. 285,743 were granted to me September 25, 1883, which improvements are hereinafter fully described, and the novel features thereof specified in the claims hereunto annexed.

Figure 9:
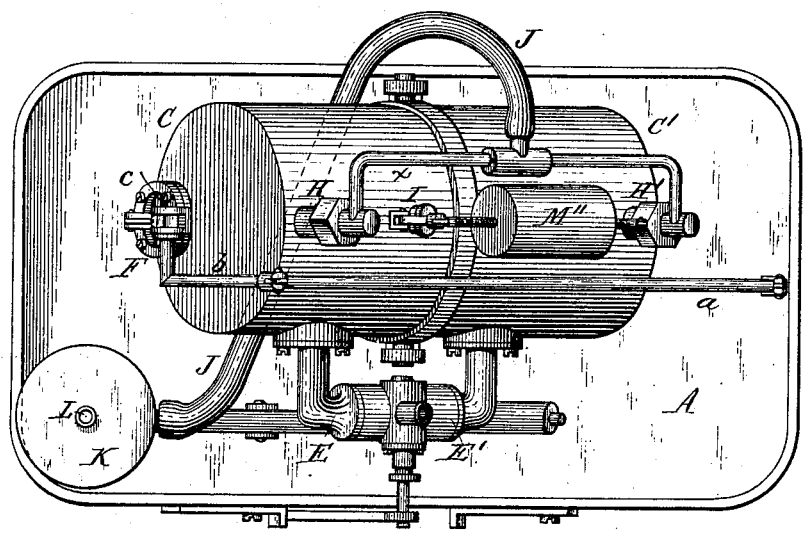
Figure 10:
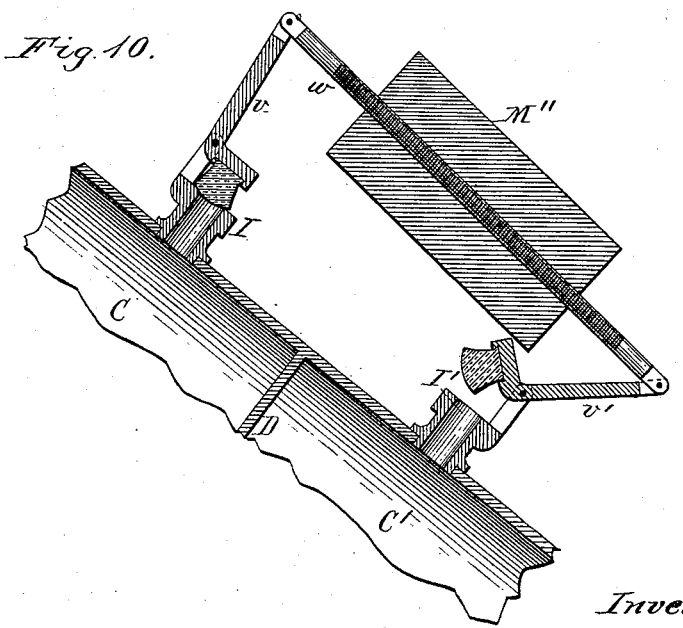
Figure 11:
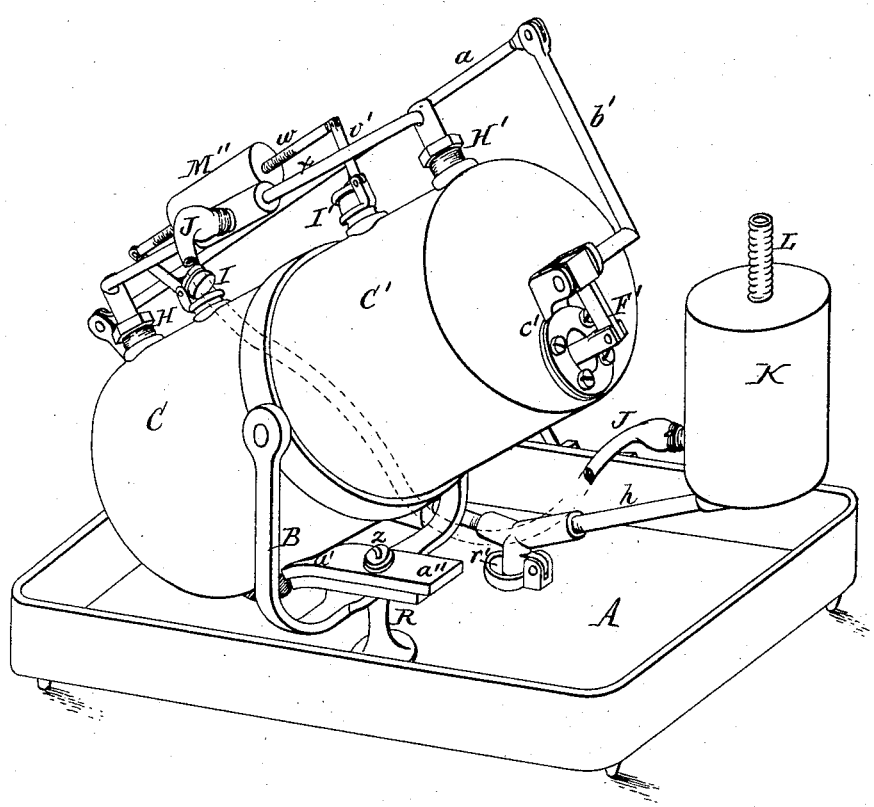

My improved air-compressor is illustrated in the accompanying drawings, in which Figure 1 is a front elevation. Fig. 2 is a central longitudinal section of the water-pressure regulator. Fig. 3 is a section through the water-inlet valve on the line $x\ x$, Fig. 1. Fig. 4 is a vertical section of the same on the line $y\ y$, Fig. 3. Fig. 5 is a section through one of the air-outlet valves. Fig. 6 is a section through the water-outlet valve. Fig. 7 is a vertical section through the water-discharge trap. Fig. 8 is a longitudinal vertical section through the stop. Fig. 9 is a top plan view of my improved air-compressor. Fig. 10 is a longitudinal section on an enlarged scale of the air-inlet valves. Fig. 11 is a perspective view of my improved air-compressor.

In the accompanying drawings, representing my improved air-compressor, A is the trough, which forms the base of the apparatus, from which rises the supporting-frame B, in which the divided cylinder C C′ oscillates on trunnions.

The oscillating cylinder consists of two air and water chambers, C C′, separated by the diaphragm D, each chamber being provided with air and water inlet and outlet valves. G is the water-inlet pipe, connecting the pressure-regulator P with the inlet-pipes E E′, which are screwed or otherwise secured to the sides of the chambers C C′, and the water-outlet valves are situated at F F′, at the outer ends of the chambers. The air enters through the valves I I′, and passes out through the valve $i$, Fig. 5, cap H, pipe $x$, and flexible tube J, to the trap K, where any water which may be accidentally carried with it from the chambers C C′ is discharged, and the compressed air passes out through the tube L to the point where it is designed to be used.

In Fig. 1 of the drawings the chamber C′ is represented as at its lowest point, in which position the water contained therein is flowing out through the valve F′ into the trough A, while air enters at I′. At this time the other chamber, C, is at its highest point, the water-outlet and air-inlet valves being closed, and it is being filled with water through the flexible pipe G and the passage E. The position of the water-inlet valve at this time is shown in Figs. 3 and 4. The air in the chamber C is forced by the entering water out through the valve $i$, Fig. 5, and the pipe $x$ until the weight of water in the chamber C causes it to fall, as shown by the dotted lines in Fig. 1, when the water-inlet valve is closed by the lever N striking against the stop M′, and the outlet-valve is opened by the weight of the levers $b\ b'$ and the rod $a$, connecting the two valves F F′. As may be readily seen in Fig. 1, when the outlet-valve F of the chamber C is closed the corresponding valve of chamber C′ is opened through the medium of the levers $b\ b'$ and the connecting-rod $a$, and vice versa.

The air-outlet pipe $x$ is screwed or otherwise connected to the cap H, Fig. 5, which is secured to the upper end of the valve-seat $j'$, suitable packing being interposed between the cap H and the valve-seat. The valve $i$ is forced upward by the air from the chamber C, allowing it to escape into the pipe $x$ until the chamber C falls, when it is held onto its seat by the back pressure of the compressed air. When the weight of the water in the chamber C is sufficient to carry it down, it descends to the position indicated by the dotted lines in Fig. 1, the rubber or spring-stop $a'$ preventing jar. As the chamber C descends the lever N moves to the position N′, striking against the adjustable stop M′, and the continued descent of the chamber causes the pinion $k$, Fig. 4, to which the lever N is rigidly connected, to move the valve $l'$, carried by the rack $l$, Fig. 4, against the valve-seat $u$ in the passage E, thereby shutting off the flow of water from the pipe G to the chamber C and opening the valve $l''$ and allowing the chamber C′ to fill through the passage E′. The water with which the chamber C was filled escapes through the valve $d$, now carried to the position $d'$, Fig. 6, by the weight of the levers $b$ and $b'$ and their connecting-rod $a$. The lever $b$ is pivoted at $c$ to an arm attached to the valve-seat F, which is screwed or otherwise secured to the end of the chamber C, extending within the chamber to form a seat for the valve $d$, suitable packing being interposed, if necessary, between the end of the chamber C and the valve-seat F. The valve $d$ slides on a guide, $e$, inside of the chamber C, and is connected by a pivoted stem to the end of the lever $b$. The stem by which the valve $d$ is connected to the lower end of the lever $b$ is provided with suitable joints, so as to allow the valve to come properly to its seat.

When the chamber C descends, the air-inlet valve I' is opened by the movement of the weight M'' on the rod $w$, which is jointed at each end to the pivoted bent levers $v$ $v'$. The weight M'' is adjustable on the threaded rod $w$, and in the position shown in dotted lines in Fig. 1 holds the valve I' of the chamber C' firmly against its seat, the valve I being thrown open by the weight M'', thus allowing air to enter the chamber C at I and the water to escape at F. While the chamber C is emptying the chamber C' is filling with water, the air being forced out through the pipe $x$, connected to the chamber at H', until the weight of water forces the chamber down, thus repeating the operation.

The water-pressure regulator is preferably fastened above the air-compressor to the wall or other suitable support, two lugs, $u'$ $u''$, Fig. 1, being provided for that purpose. Connection is made with the water-supply pipe by the screw-coupling $t$ or other device, and another coupling is provided at the bottom for attaching the pipe G, which carries the water from the regulator to the oscillating chambers. The water from the mains or other service of supply enters at $t$, Fig. 2, and passes up inside the body $m$, Fig. 2, over the top of the tube $o$, as indicated by the arrows, into the chamber $r$ at the bottom of the device, and thence out through the tube G and the pipes E E' into the chambers C C'. The lower end of the tube $o$ is screwed into or otherwise secured to the piston $p$, which is suitably packed so as to be water-tight, and which is capable of playing up and down in the cylinder $m'$ in the lower part of the water-regulator. Against the upper surface of this plate the spring $s$ bears, being forced against it by the screw $q$. When the water-pressure in chamber $r$ is greater than that for which the spring $s$ is set, its pressure against the piston $p$ forces the tube $o$ up against the packing in the screw-cap $n$, thereby diminishing or shutting off the supply of water to the chambers C and C'. The amount of pressure required to accomplish this result may be readily varied by adjusting the screw $q$, which presses the spring $s$ against the plate $p$.

The compressed air passes from the chambers C C' through the tubes $x$ and J to the trap K, which is pivoted on a lug in the bottom of the trough A, (see Fig. 7,) being provided with a weight, $g$, adjustable by means of a set-screw or other device on the arm $f$. A tube, $h$, passes from the bottom of the trap K to the floor of the trough A, where it is held against suitable packing by the weight $g$. The object of this device is to collect and discharge any water which may be accidentally carried over with the air through the valves $i$ to the trap K, where it falls to the bottom while the air passes out through the tube L. When sufficient water has accumulated in the trap K to overcome the weight $g$, the chamber falls to the position indicated by the dotted lines K', and the water runs into the trough A from the tube $h$ until the weight again forces the tube $h$ back to its seat. These air-compressors are generally used for the purpose of forcing beer, ale, &c., from the barrel in the cellar to the tap-room. If the compressor should get out of order, the water is liable to pass through the compressing-chamber and air-pipe and enter the barrel, thus spoiling the beer. This is prevented by the water-trap, which immediately opens in such a case and provides a free escape for the water.

The water-inlet valves $l'$ $l''$ are grooved so as to afford passage to the water, and still to bear on the inside of the valve-casing. They are preferably provided with suitable packing on their faces so as to prevent the escape of any water when pressed against the valve-seats. The pinion $k$ is provided with a stem, $k'$, passing out the valve-casing, and the lever N is rigidly secured to the stem $k'$. A stuffing-box, O P', Fig. 3, may be provided when the stem passes through the valve-casing.

As shown in Fig. 7, a recess, $r'$, is formed on the bottom of the trough A, for the purpose of retaining in place the packing $q'$, against which the end of tube $h$ rests, to form a water-tight packing when the trap is closed.

The stop $a'$ $a''$, Fig. 8, against which the chambers C C' strike at the lowest point of their oscillation, is preferably formed of a piece of sheet rubber clamped by a screw between the plate $z$ and the support R, although a stop of any other preferred form or material may be used.

I claim—

1. The combination, with the oscillating chambers C C', of a stop to arrest the oscillation, consisting of the rubber band $a'$ $a''$, attached at its center to a suitable support, R, substantially as and for the purposes set forth.

2. The combination, with the oscillating chambers C C', provided with suitable water inlet and outlet and air-outlet valves, of the air-inlet valves I I', attached to the upper sides of the chambers, bent levers $v$ $v'$, weight M'', and screw-threaded rod $w$, substantially as set forth.

3. The pivoted counterweighted water-trap composed of a chamber, K, in which the water separates from the air, a pipe through which the compressed air enters said chamber, a pipe through which the dry air escapes from said chamber, and a pipe through which the water is automatically discharged, substantially as set forth.

4. The combination, with the oscillating air-compressing apparatus, of a flexible air-pipe, J, through which the compressed air is discharged from the compressing apparatus, and a pivoted counterweighted water-trap, K, connected with the flexible pipe and provided with an escape-pipe for the dry air, and a pipe through which the water is automatically discharged, substantially as set forth.

5. The combination, with the movable trap K, of the arm $f$, weight $g$, and tube $h$, arranged to close the trap by contact between its open end, and suitable packing, $q'$, substantially as described.

6. The combination, with a hydraulic air-compressing apparatus and the pipe through which the compressed air is delivered therefrom, of a pivoted counterweighted water-trap which is connected with said air-pipe and which consists of a chamber in which the water carried off by the compressed air is deposited, a discharge-pipe through which the water is automatically discharged, and an air-pipe through which the compressed air is discharged free from water, substantially as set forth.

WILLIAM T. FOX.

Witnesses:
H. G. PHILLIPS,
S. WHITE PAINE.